United States Patent

[11] 3,576,406

[72] Inventors Louis Court
Dugny;
Patrick Magnien, leMesnil-Saint-Denis,
France
[21] Appl. No. 796,483
[22] Filed Feb. 4, 1969
[45] Patented Apr. 27, 1971
[73] Assignee Commissariat A L'Energie Atomique
Paris, France
[32] Priority Feb. 14, 1968
[33] France
[31] 139893

[54] PROCESS AND APPARATUS FOR PROVIDING A TIME DELAY IN THE REPRODUCTION OF INFORMATION STORED ON A CIRCULATING RECORDING MEDIUM
8 Claims, 3 Drawing Figs.

[52] U.S. Cl. ........ 179/100.2
[51] Int. Cl. ........ G11b 27/22
[50] Field of Search ........ 179/100.2, 100.2 (S), 100.2 (MI), 100.2 (B); 178/6.6 (PSC), 6.6 (FSS); 226/42, 113, 118

[56] References Cited
UNITED STATES PATENTS
2,979,558 4/1961 Leyton ........ 178/6.6
OTHER REFERENCES
AN AUTO AND CROSS-CORRELATOR FOR DIGITAL INFORMATION, Burns et al., " Electronic Engineering" Apr. 1963, ps. 220— 228.

*Primary Examiner*—Bernard Konick
*Assistant Examiner*—Robert S. Tupper
*Attorney*—Cameron, Kerkam and Sutton

ABSTRACT: Method and apparatus of producing an adjustable time-delay in the reproducing of information which is recorded on a magnetic tape, said time-delay being materialized by an open loop upstream of a reproducing head. A signal is recorded on the tape upstream of said loop and simultaneous the measurement of the predetermined time-delay is initiated; the passage of said signal is detected by the reading head and the absolute value and the direction of the time interval which elapses between the end of measurement of said time-delay and the detection are measured. The length of the loop is automatically modified if necessary, by an amount which increases with said absolute value and in a direction corresponding to the reduction of said time interval to zero.

PROCESS AND APPARATUS FOR PROVIDING A TIME DELAY IN THE REPRODUCTION OF INFORMATION STORED ON A CIRCULATING RECORDING MEDIUM

The invention is directed to a method of producing an adjustable time-delay in the reading of information which has been recorded on a circulating medium such as a magnetic tape and also to a device for carrying out said method.

The aim of the invention is to permit the production of a predetermined time-delay between recording and reading on the recording medium, said time-delay being adjustable by manual or automatic setting in response to indications provided by a preestablished program. Devices of this type have already been developed in order to make available at a given moment any information or datum which is recorded on one track of a circulating medium and the same datum which is displaced in time. Devices of this type have been employed especially in the reproduction of sound recordings for the artificial production of an echo or a reverberation. They have also been employed for the purpose of studying the functions of auto-correlation of a phenomenon or cross-correlation between two phenomena whose occurrences are recorded on different tracks of a single magnetic tape. A description of an application of this type and of the system employed for such an application may be found, for example, in the article entitled "An auto and cross-correlator for digital information" which was published in the Apr. 1963 issue of "Electronic Engineering," pages 220—228.

A number of different methods have been adopted for establishing an adjustable reading time-delay: according to one method which appears preferable and which is frequently employed, the time-delay is established and regulated by producing on the path which is followed by the recording medium an open loop of variable length which can be adjusted between a recording element and a reading element or between two successive reading elements on two tracks of the same recording medium. At a constant rate of transfer of the recording medium, the time-delay between the recording operation and the reading operation or between two reading operations is a linear function of the length of the loop, said length being adjusted by displacement of a pulley: this arrangement permits of simple construction, is easy to use, is of extremely rugged design and does not interfere with the operation of the drive mechanism.

The invention is directed to the design concept of a method for producing a predetermined time-delay which may be programmed in time if necessary, which provides automatic compensation for error and instability factors such as variations in rate of transfer as a result of drift or imperfections in the speed-regulating system of the driving motor.

With this objective, the invention proposes a method for producing an adjustable time-delay in the reading of information from a circulating recording medium, said time-delay being materialized by an open loop in said recording medium upstream of the reading element. Said method essentially comprises recording a signal on the medium upstream of said loop and simultaneously initiating the measurement of the predetermined time-delay; detecting the passage of said signal by means of the reading element; determining the absolute value and the direction of the time interval which elapses between the end of measurement of said time-delay and the detection, and possible modification of the length of the loop by an amount which increases with said absolute value and in a direction corresponding to the reduction of said interval to zero.

The invention also proposes a device for carrying out the foregoing method or a like method. This device comprises means for recording a signal on said medium upstream of the loop while at the same time triggering a scaler for counting said time-delay, means for reading the passage of the signal, a comparator providing signals representing the time interval which elapses between the detection of the signal and the end of the time-delay and the direction thereof, and elements for controlling a motor which produces a modification in the length of the loop.

The invention is also characterized by further arrangements which can advantageously be employed in conjunction with the foregoing arrangements but can also be adopted independently. A clearer understanding of the invention will be gained from the following description of one mode of application which is given by way of example without any limitation being thereby implied. Reference is made to the accompanying drawings, in which.

Figure 1:
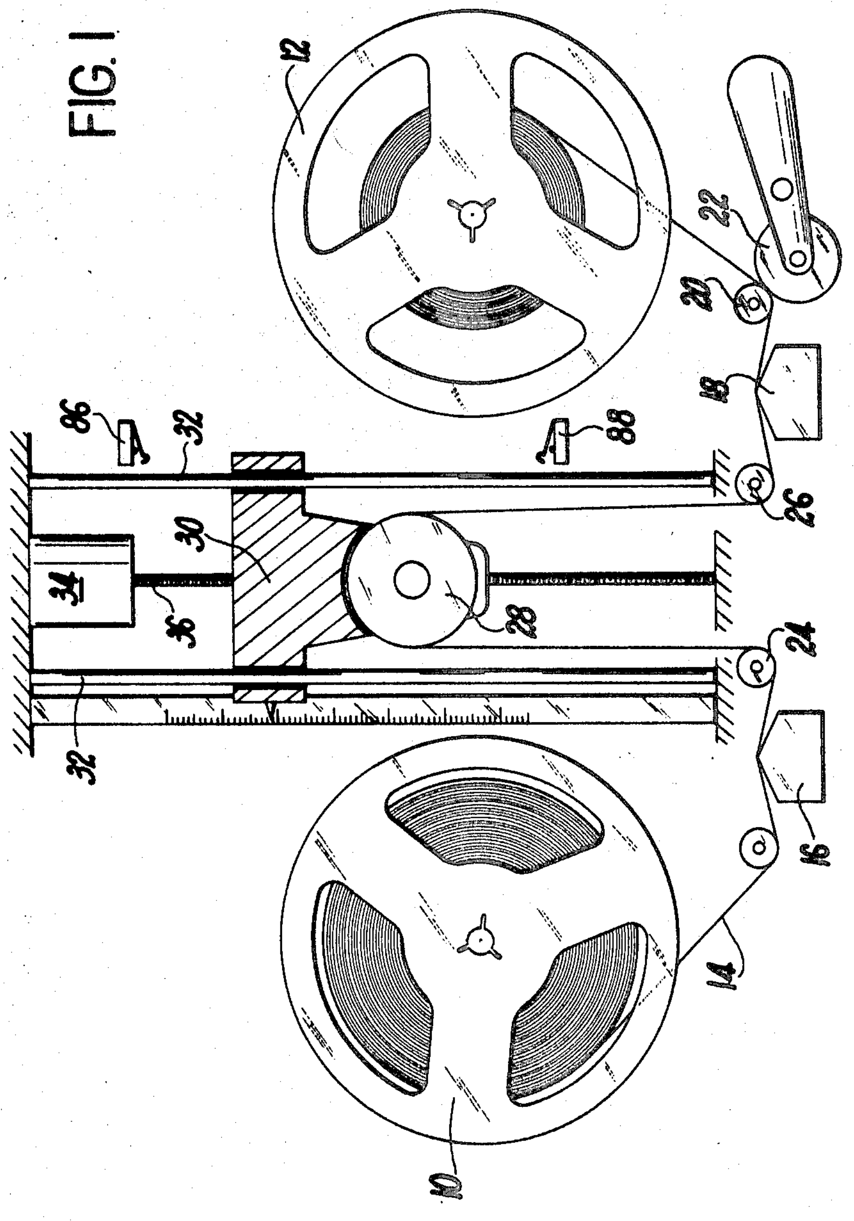
FIG. 1 shows diagrammatically the mechanical components of a recording and reproduction apparatus which is intended to adjust the loop length on the path of a magnetic recording medium.

FIG. 1 shows the deck of a magnetic-tape recording and reading apparatus. Said deck carries a payoff reel 10 and a takeup reel 12 between which is transferred a recording tape 14 provided with a plurality of tracks. The deck also carries a recording head 16 and a reading head 18 against which the tape 14 passes.

The magnetic tape is transferred by means of a capstan 20 which rotates at a constant speed, a pulley 22 which is subjected to the action of a spring being continuously applied against the tape.

The adjustable time-delay between the passage of the tape in front of the recording head and in front of the reading head can be regulated by modifying the length of a loop which is followed by the magnetic tape between the two heads. Said loop is formed between two guide pulleys 24 and 26 by means of a roller 28 supported by a carriage 30 which is displaceable along guide rods 32. A servomotor 34 drives a lead-screw 36 which passes through a nut carried by the carriage. It is thus apparent that the rotation of the lead-screw 36 causes the displacement of the carriage along the guide rods 32 in a direction which depends on the direction of rotation of said screw.

Figure 2:
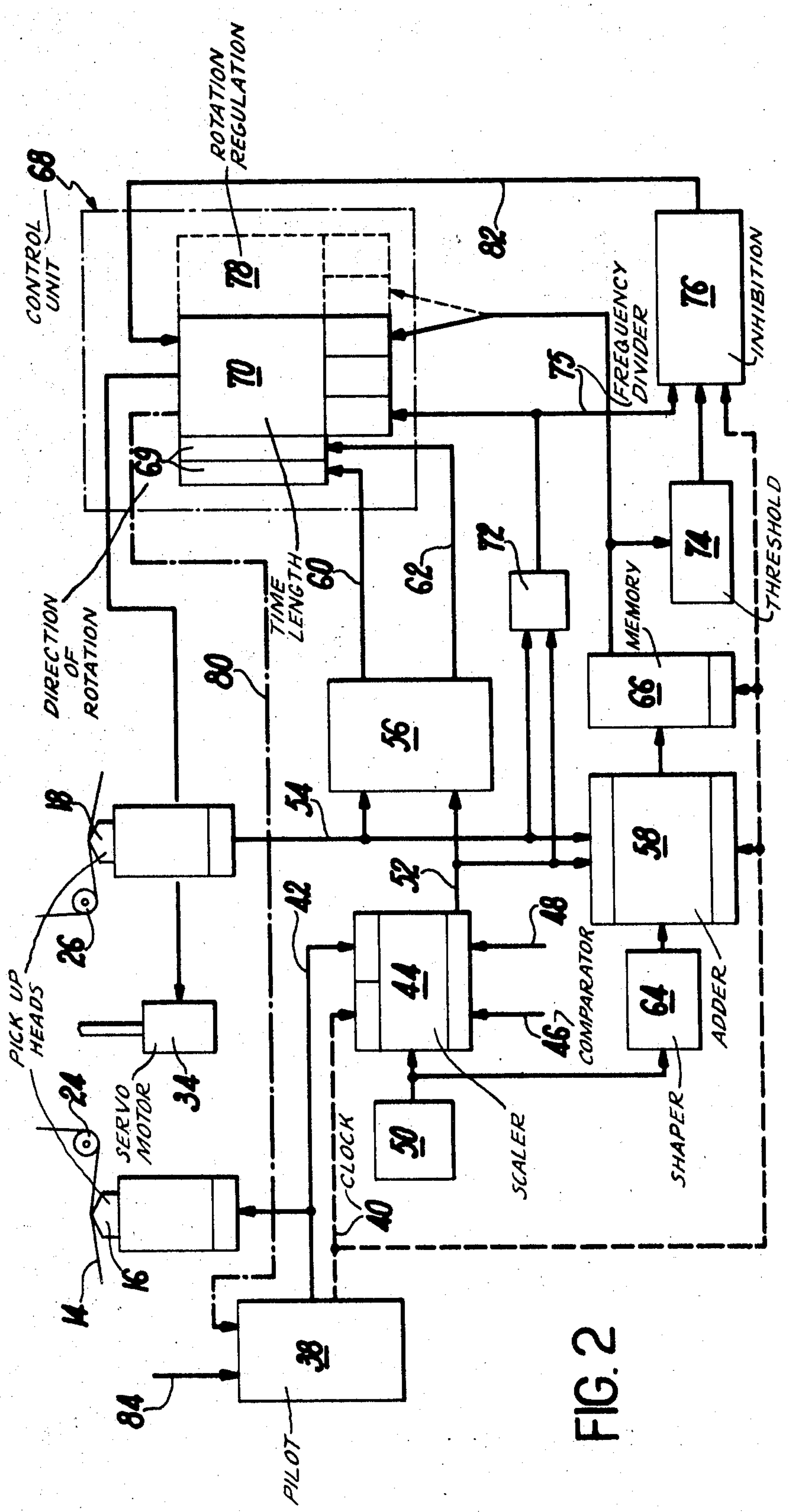
FIG. 2 is a highly simplified block diagram of a device in accordance with the invention which controls the loop servomotor of the recording unit of FIG. 1.

The rotation of the servomotor 34 either in one direction or in the other is controlled by the electronic circuit shown in the block diagram in FIg. 2. This device comprises a pilot stage 38 which is intended to produce at a uniform rate:

- at a first output 40 a pulse for resetting a series of elements of the device which will be described hereinafter;
- at a second output 42 a signal which follows the emission of the pulse.

The outputs 40 and 42 are coupled respectively to the resetting and triggering inputs of a pulse-precounting scaler 44. The precounting operation can be regulated either manually (input 46) or by means of a programming circuit (input 48). The signal received by the scaler 44 from the output 42 initiates the counting of pulses produced at a constant rate by a calibration frequency generator such as a clock 50. The output 42 is also coupled to the recording head 16, so that the beginning of the counting operation coincides with the recording of a signal on one track of the magnetic tape 14. The head 16 is preferably preceded by a circuit for coding the signal in order to prevent any confusion between this latter and a spurious signal during the reading operation.

The output 52 of the scaler 44 and the output 54 of the decoder which is associated with the reading head 18 drive on the one hand a comparator 56 which is intended to determine the direction of the time interval which elapses between the instant corresponding to the end of counting by the scaler 44 and the instant of passage of the signal which is recorded in front of the head 18 and, on the other hand, a pulse integrator 58 which records the number of pulses between these two instants and gives the absolute value of said time interval. The comparator 56 is constituted by a conventional circuit in which the internal logic is such that, if the pulse which arrives through the output 54 precedes the pulse which is supplied through the output 52, a pulse is delivered at the output 60 whereas, in the contrary case, a pulse is delivered at the output 62.

The integrator 58 which is intended to determine the time interval which elapses between the arrival of the initial pulse (whichever pulse this may be) from the arrival of the second pulse effects the linear integration of the pulses supplied to said integrator by the clock pulse generator 50 via a shaping circuit 64 from the moment when the initial pulse reaches said integrator from the output 52 or 54 up to the moment when the second pulse arrives from the output 54 or 52. When the second pulse is received, the integrator 58 supplies a storage device 66 at a voltage $U_t$ which is proportional to the number of clock pulses received. The comparator 56 and the storage device 66 supply a control unit 68 of the servomotor 34. Said control unit 68 comprises a regulating device which determines the amplitude of rotation of the motor 34 and a regulating device which determines the direction of rotation. The "-direction of rotation" regulating device 69 which is supplied through the outputs 60 and 62 determines at each moment the direction in which the servomotor must rotate in order to cancel the difference between the required time-delay indicated in the pilot stage 38 and the actual time-delay. If the output pulse delivered by the comparator 56 appears at the output 60, the control unit 68 of the servomotor must produce the rotation of said motor in the direction which increases the length of the loop; if the pulse is delivered at the output 62, the control unit must determine the rotation of the servomotor in a direction such that the length of the loop decreases.

A number of alternatives are available for selecting the intended amplitude of rotation of the servomotor 34;

a. The motor 34 can be caused to rotate in one direction at a constant speed for a period of time which is an increasing function of $U_t$.

b. The motor 34 can be caused to rotate for a constant preadjusted period of time but at a speed which is an increasing function of $U_t$.

c. The motor can be caused to rotate for a predetermined period of time at a given speed. This solution does not appear to be of interest as it would lead to a large number of control cycles as will be apparent hereinafter but could nevertheless be adopted in the case of sequential analysis in which a series of successive stepped time-delays may be required.

d. Finally, both the period and the speed can be made a function of $U_t$ but the adjustment would present some difficulty in such a case.

The control unit 68 which is shown in FIG. 2 is designed to permit adoption of either of the two above alternatives (a) and (b). Said control unit comprises a "rotation time" regulating device 70 (shown in full lines) which has an input coupled to the storage device 66 and which establishes the times of application of the control current of the servomotor 34 at a constant speed of rotation. Startup of the servomotor during this application time is produced upon receipt of the second pulse of the two pulses supplied to the integrator 58 on outputs 52, 54 by a binary frequency divider 72 which emits a single pulse for every two pulses received when the second pulse is received. The control unit 68 is evidently provided with manual or automatic regulation means for establishing the coefficient of proportionality between the amplitude of the time-delay error and the time of rotation of the servomotor 34. By virtue of a suitable choice of the frequency of the pulses derived from the clock pulse generator and of the coefficient of proportionality between the amplitude of the error and the time, it is possible in theory to reduce the error to zero in a single correction cycle. In point of fact, this adjustment is very critical and very delicate if it is desired to prevent any danger of hunting effects and is subject to instabilities in time. In consequence, it is usually preferable to make provision for a number of successive cycles in order to ensure complete elimination of the error. It is also preferable to adopt a different relation instead of a law of proportionality between the error and the time of rotation as well as to provide an error threshold below which the regulation does not come into effect. The threshold can be created by applying the output voltage of the storage device 66 not only to the control unit 68 but also to a threshold circuit 74 which delivers an output signal only if the voltage $U_t$ in the storage device 66 is higher than a predetermined minimum voltage $U_{to}$. Thus, the threshold circuit 74 supplies via the conductor 75 a device 76 which permits processing of the information and blocks the control unit outside those periods in which the stored voltage is higher than the predetermined threshold $U_{to}$ and interrupts the control cycles as soon as $U_t$ becomes lower than $U_{to}$.

The "speed of rotation" regulating device 78 (shown in dashed lines) of the control unit of the servomotor can receive the output signal of the storage device 66 instead of the regulating device 70. Said device 78 determines the law of proportionality between $U_t$ and the speed of rotation.

Figure 3:
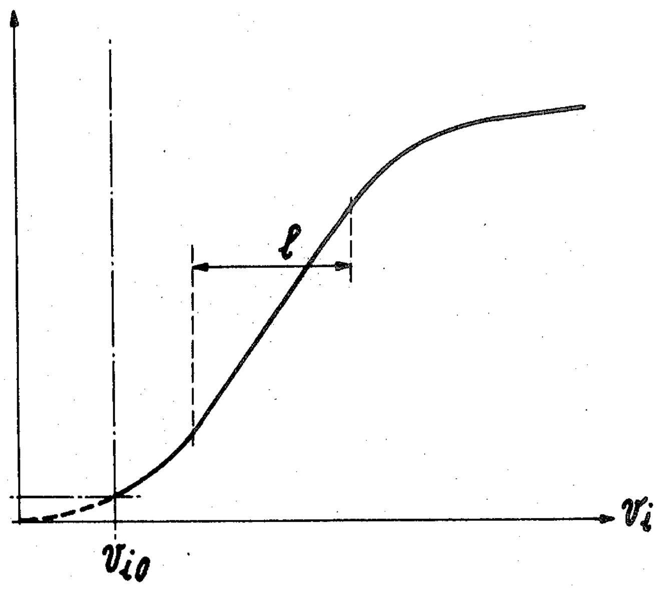
FIG. 3 is a curve representing the response characteristic of the device according to FIG. 1.

The regulating devices 70 and 78 are advantageously designed to provide a regulation curve of the type shown in FIG. 3 in which the time of rotation of the servomotor 34 is plotted as ordinates and the amplitude of the difference is plotted as abscissae. The curve representing the time of rotation exhibits a linear portion of adjustable slope and the time of rotation tends towards a limit in the case of substantial differences. Hunting of the servomechanism is thus prevented. In the case of small differences, the time of rotation changes at a slower rate than in the case of intermediate differences (linear portion of the curve) and the regulation no longer comes into effect in order to actuate the servomotor 34 below a predetermined value $U_{to}$.

It can be considered that a critical adjustment of the regulating chain (choice of the clock pulse frequency and of the law of proportionality between the magnitude of the difference and the amplitude of the action which is intended to correct said difference) would permit the elimination of the time-delay error in a single control cycle. In point of fact, this critical adjustment is too difficult and it is preferable to provide a number of successive and progressive cycles in order to reduce the difference to zero.

The "rotation time" regulating device 70 of the control unit 68 has an output known as an "internal trip" output 80: this output delivers a pulse at the same time as the rotation of the servomotor 34 stops, said pulse being processed by the unit 68 either for a fixed time of rotation of the motor (the speed being a function of $U_t$) or for a fixed speed (the time being variable according to $U_t$): this pulse is applied to the input of the pilot circuit 38 so as to initiate a further control cycle.

It is also preferable to interrupt the control cycles by providing a trip by external control of the "rotation time" regulating device 70. In the diagram which is shown in FIG. 2, the control is indicated by the conductor 82 which supplies a trip order emitted by the "processing-permitted" device 76 when this latter receives from the halving device 72 a pulse which is validated within the device 76 only if the condition $U_t$<Uis satisfied. In order to prevent any faulty operation, the external trip order must be maintained in the "rotation time" regulating device 70 throughout the data-processing time. This trip order which is maintained by the conductor 82 will be cancelled only by the reset signal which is delivered by the pilot circuit 38 at the output 40 thereof as a result of an intentional reset whether manual or programmed.

In order to increase the range of time-delays which is covered by the device, two contact-breakers 86 and 88 are advantageously placed so as to be closed at the end of travel by the carriage (FIG. 1). Said contact-breakers control the transmission of the tape-transfer motor and change the tape speed if the carriage comes up against an end-of-travel stop. If the carriage comes into the top position of abutment and closes the contact-breaker 86, the tape speed is consequently too high and must be switched to the speed immediately below. If the carriage comes into the bottom position of abutment and closes the contact-breaker 88, the tape speed should be switched to the value immediately above. It is in any case preferable to place the contact-breaker 88 so as to maintain a bottom clearance, that is to say to prevent the carriage from withdrawing completely to the bottom position. In this manner, the delay-time ranges are permitted to overlap: as a rule, a bottom limit position which is materialized by the contact-breaker 88 and which corresponds to one-tenth of the total travel is found to give satisfactory results.

One example of construction of the device hereinabove described which makes use of the method in accordance with the invention will now be described. For the sake of simplicity, it will be assumed that the magnetic tape is provided with only three tracks which will be designated hereunder as the tracks $14_1$, $14_2$, $14_3$; the recording head 16 and reading head 18 are also multiple elements which serve to produce action independently on the different tracks, said tracks being assigned as follows:

Track $14_1$: recording and reading of the coded signal;
Track $14_2$: reading of the initial prerecorded information;
Track $14_3$: recording and reading of the information read on the track $14_2$ by the reading head 18.

The time-delay to be produced is indicated for example by means of the control input 46 in the form of a predetermined precount by the scaler 44. The operation which is initiated either manually (input 84) or automatically results in a repetition of the following cycle, in sequence:

1. The pilot stage delivers at its output 40 a reset pulse which is transmitted to the scaler 44, to the integrator 58, to the storage device 66 and to the device 76. (For the sake of enhanced clarity, the reset conductors are shown in dashed lines in FIG. 2.)

2. The pilot stage then delivers at the output 42 a trigger pulse which initiates the counting by the scaler 44 and which is recorded in coded form on the track $14_1$ by the head 16. From this moment, the scaler 44 counts the signals derived from the clock pulse generator 50 and the coded signal which is recorded on the track $14_1$ is directed towards the reading head 18.

The error difference signal will appear in the following manner:

If the counting operation by the precount scaler 44 is completed before the recorded coded signal has been read by the reading element 18, the real time-delay is too long and the amplitude of the time-delay error is equal to the time which has elapsed between the appearance of the end-of-counting signal delivered by the scaler 44 at its output 52 and the instant of reading of the coded signal by the head 18;

If the counting operation by the precount scaler 44 is completed after reading of the coded signal by the head 18, it is because the real time-delay is too short; the error is again equal to the time which has elapsed between the reading of the coded signal and the end of the scaler count.

3. Depending on the direction of the error, a signal appears either at the output 60 or at the output 62 of the comparator 56 and determines the direction in which the motor 34 will rotate at the time of the regulation. The amplitude of the error is recorded in the storage device 66 in the form of a number of clock pulses.

4. The regulation comes into effect when the halving circuit 72 delivers an output signal; the regulation is dependent on the presence of a validation signal supplied by the device 76 if the signal $U_i$ which is recorded in the storage device is higher than a value $U_{io}$. Two cases can therefore arise:

If $U_i \geq U_{io}$, then this is outside the tolerance range: the adjustment of the loop is not sufficiently close to the correct value and an adjustment will take place as soon as a signal has been emitted by the circuit 72;

If $U_i$ is $< U_{io}$, this is within the tolerance range and no adjustment takes place; it must also be noted that the inequality $U_i < U$ considered alone is not a sufficient condition inasmuch as $U_i$ is zero at the moment when the initial reset pulse arrives and remains smaller than $U_{io}$ as long as a sufficient number of clock pulses has not been summated. The inequality $U_i < U$ assumes a significant value only at the end of the integration operation by the integrator 58, that is to say when the halving circuit 72 delivers its output pulse.

The presence of the threshold prevents any danger of hunting which would otherwise be considerable since the servomechanism operates in delayed sequence: in a first stage, it receives the error signal; in a second stage, it tends to reduce the error.

5. At the instant of stopping of the rotation of the motor 34, the "rotation time" regulating device 70 delivers at the output 80 an "internal trip" signal which again releases the pilot stage 38 so as to initiate the performance of a further cycle.

It is readily apparent that a large number of variants of the invention can be contemplated. In one alternative form, the speed of rotation of the motor which drives the tape-transfer capstan 20 is controlled in dependence on a variable-frequency clock pulse generator 50; the clock pulse frequency is accordingly controlled as a function of the requisite time-delay and the speed of rotation, which constitutes a further-available variable, produces action so as to nullify the time-delay error either in order to perfect the action of the loop length or on the contrary in order to carry out a preliminary adjustment. This solution evidently introduces a complication in the logic of the assembly since it is necessary to decide upon the variable to be dealt with when making error corrections: it would in fact be a matter of difficulty to modify both the tape speed and the length of loop at the same time.

Irrespective of the particular variant which may be employed, one of the essential advantages of the invention is secured: the information remains in continuous analog form whereas, in many other methods, the initial analog signal has to be converted to a coded digital form. This advantage endows the invention with a high degree of flexibility and makes it suitable for a large number of different applications. Thus, in biology and medicine, the system can be employed in electrocardiography, defibrillation, electroencephalography and reanimation. In data-processing, the system permits of cross-correlations and auto-correlations. Artificial reverberations and multiple echos can also be produced in studies relating to acoustics. And the system also makes it possible to cancel a signal which is present among other signals by self-shifting 180° in phase.

We claim:

1. A method of producing an adjustable time-delay in the reading of information recorded on a circulating recording magnetic tape, said time-delay being provided by an open loop in the recording tape upstream of a reading element comprising the steps of recording a signal on the tape upstream of said loop, simultaneously initiating the measurement of the predetermined time-delay, detecting the passage of said signal of the reading element, determining the absolute value and the direction of the time interval between the end of measurement of said time-delay and the detection of the signal, and adjusting the length of the loop responsive to the time interval by an amount which increases with said absolute value and in a direction corresponding to the reduction of said time interval.

2. A method in accordance with claim 1, the amplitude of the adjustment of the length of the loop being proportional to said absolute value in a predetermined range of said absolute values and lower values above and below said range.

3. A device for producing an adjustable time-delay in the reading of information from a circulating recording medium such as a magnetic tape, comprising means for recording a signal on said medium and upstream of an open loop formed with said medium while at the same time triggering a scaler for counting said time-delay, means downstream of the loop for reading the passage of the signal, a comparator assembly for delivering signals representing the time interval which elapses between the detecting of the signal and the end of said adjustable time-delay and the direction thereof, a motor controlling the length of the loop and means controlling the operation of said motor responsive to the amplitude and direction of said time interval for decreasing said time interval.

4. A device in accordance with claim 3, wherein said comparator assembly comprises a comparator which delivers a different signal according to the direction of the time interval which elapses between the instant corresponding to the end of counting by the scaler which is supplied by a clock pulse generator and the instant of passage of the recorded signal in front of the reading means and a pulse integrator which records the number of pulses delivered by the clock pulse generator between the two instants aforesaid and provides the absolute value of the time interval.

5. A device in accordance with claim 3, said control means energizing the motor for rotation at constant speed for a time period which is an increasing function of said time interval.

6. A device in accordance with claim 3, said control means energizing the motor for a constant preadjusted period at a speed which is an increasing function of said time interval.

7. A device in accordance with claim 3, comprising a threshold circuit interposed between the comparator assembly and the control means for inhibiting energization of said motor when the time interval is smaller than a predetermined value.

8. A device in accordance with claim 3, wherein the length of the loop is modified by a carriage displaced between two stop positions and means for switching the rate of movement of the circulating recording medium as said carriage engages one of said stops.